(12) United States Patent
Tyler et al.

(10) Patent No.: US 6,911,241 B2
(45) Date of Patent: Jun. 28, 2005

(54) CONTAINERS FROM LAMINATES HAVING A FOAMED POLYMER LAYER

(75) Inventors: Warren C. Tyler, Tubac, AZ (US); Steven G. Taylor, Columbus, OH (US); Melvin L. Druin, Freehold, NJ (US); Arthur W. Robichaud, Kittery, ME (US)

(73) Assignee: SIG Combibloc, Inc., Columbus, OH (US)

( * ) Notice: Subject to any disclaimer, the term of this patent is extended or adjusted under 35 U.S.C. 154(b) by 0 days.

(21) Appl. No.: 10/317,954

(22) Filed: Dec. 12, 2002

(65) Prior Publication Data

US 2003/0091774 A1 May 15, 2003

Related U.S. Application Data

(63) Continuation of application No. 09/130,291, filed on Aug. 6, 1998, now abandoned.

(51) Int. Cl.[7] .............................................. B29D 22/00
(52) U.S. Cl. ...................... 428/36.5; 428/349; 428/480; 428/483
(58) Field of Search ................................. 428/36.5, 349, 428/480, 483, 35.7, 347

(56) References Cited

U.S. PATENT DOCUMENTS

| | | | | | |
|---|---|---|---|---|---|
| 4,578,297 | A | * | 3/1986 | Duncan | 428/36.5 |
| 4,832,775 | A | * | 5/1989 | Park et al. | 156/272.6 |
| 5,744,181 | A | * | 4/1998 | Sorway et al. | 426/106 |
| 6,365,249 | B1 | * | 4/2002 | Al Ghatta et al. | 428/36.6 |

FOREIGN PATENT DOCUMENTS

| | | | | |
|---|---|---|---|---|
| JP | 02252527 A | * | 10/1990 | B29C/53/36 |
| WO | WO 97/002139 | * | 1/1997 | |

* cited by examiner

Primary Examiner—Sandra M. Nolan
(74) Attorney, Agent, or Firm—Standley Law Group LLP

(57) ABSTRACT

A container constructed from a laminate structure that includes a layer of foamed polymer. The layer of foamed polymer replaces the paperboard layer of known laminate structures. A preferred embodiment of the laminate structure is comprised of a layer of foamed polymer, a first layer of low density polyethylene, a second layer of low density polyethylene, a layer of aluminum foil, a tie layer, and a third layer of low density polyethylene. The container has a non-polar homogeneous heat seal that may be created by conventional equipment at a temperature ranging from about 250 degrees Fahrenheit to about 500 degrees Fahrenheit.

9 Claims, 8 Drawing Sheets

CONTAINERS FROM LAMINATES HAVING A FOAMED POLYMER LAYER

This application claims priority benefit from U.S. application Ser. No. 09/130,291, filed Aug. 6, 1998, now abandoned, which is incorporated herein by reference.

BACKGROUND AND SUMMARY OF THE INVENTION

The present invention relates generally to containers, and more particularly, to containers prepared from heat-sealable laminate structures that include a layer of foamed polymer. The heat-sealable laminate structures of the present invention may include barriers commonly used to prevent oxygen from being transmitted to the product and/or to prevent water loss from the product.

Paperboard, heat-sealable polyethylenes, aluminum foil, and/or barrier polymers such as an ethylene vinyl alcohol copolymer (EVOH) are primary components of many known containers.

Heat-sealable polyethylenes are commonly used as the product-contact layer of many known containers to provide a water/water vapor barrier to the structure, but they may have a deleterious effect on some products such as citrus juices by absorbing product flavor components and/or aroma oils. In addition to eroding product quality, the absorption of these oils may cause decay of the heat seals of containers by stress-cracking the polyethylene to the extent that the liquid may penetrate the paperboard.

Container structures that use paperboard may have a number of shortcomings:

1) Paperboard will deteriorate if it is saturated by liquid.

2) Paperboard structures may have a poor strength to weight ratio.

3) Paperboard may be difficult to fold and crease.

4) Paperboard may not collapse or be compressed during conventional heat sealing.

5) Paperboard may contain contaminating aromas.

6) Paperboard may contain microorganisms and thus requires some form of raw edge protection to prevent product contamination.

7) During heat sealing of paperboard laminate structures, the heat may cause water to be vaporized from the paperboard resulting in delamination of polyethylene coatings.

A need exists to replace the paperboard in existing container structures with a material that:

1) Is impervious to liquids such as water and oils.

2) Has greater strength, flexibility, and durability at a lower cost and weight.

3) Is non-scalping with regard to aromas, flavors, and vitamins.

4) May provide a better seal by flowing and compressing during heat sealing.

5) May permanently retain creases uniformly with direction.

6) May be formed into cartons of various shapes.

7) Eliminates the need for raw edge protection to prevent product contamination.

The present invention provides containers prepared from heat-sealable laminate structures, either with or without a barrier that include a layer of foamed polymer that satisfy some or all of these needs. Also, the foamed polymer layer of the present invention provides benefits such as the ability to specifically engineer it for caliper, density, cell size, and skin surface along with the opportunity to process the material either in the direction of the web or across the web without reducing the inherent strength of the material. For example, the foamed polymer layer may be compressed and/or collapsed to a smaller caliper in the seal area during heat sealing. In addition, the foamed polymer layer may be creased to a smaller caliper that may allow for shorter radius bends that cause less stress on the other layers of the laminate structure.

In preferred embodiments of the present invention, the layer of foamed polymer is impervious to liquids, and it is more flexible, durable, and resilient than paperboard. Additionally, the layer of foamed polymer may be easier to fold and crease than paperboard while offering improved compressibility. The strength to weight ratio of foamed polymers is also preferably greater than paperboard and, as a result, the present invention may allow the production of containers at a lower cost than paperboard containers that serve the same function.

When combined with a barrier layer in addition to the foamed polymer layer, the heat-sealable laminate structures of preferred embodiments provide oxygen barrier properties.

Finally, certain of the preferred embodiments offer the additional benefits of microwave heating and/or non-absorption of essential oils, flavors, or vitamins.

In addition to the novel features and advantages mentioned above, other objects and advantages of the present invention will be readily apparent from the following descriptions of the drawings and preferred embodiments.

DETAILED DESCRIPTION OF PREFERRED EMBODIMENT(S)

Figure 1:
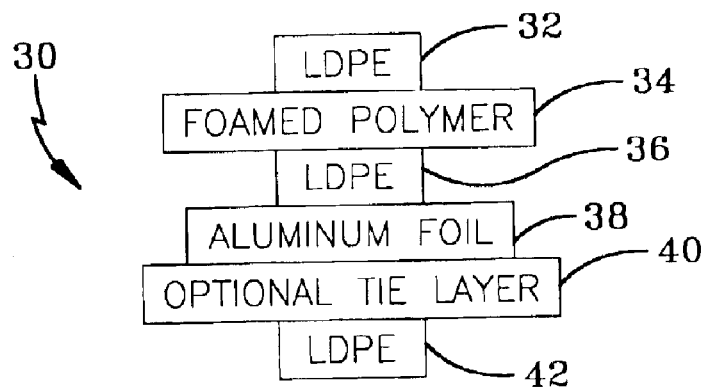
FIG. 1 is a cross sectional view of one embodiment of a laminate structure of the present invention.

The containers of the present invention are preferably adapted to serve the same uses and purposes as known liquid packaging containers. For example, the containers of the present invention may be fitted, opened, and/or closed with conventional closure and/or opening devices including, but not limited to, pull tabs, caps, screw caps, pop-tops, the devices disclosed in U.S. Pat. No. 5,101,999, U.S. Pat. No. 5,639,018, and U.S. Design Pat. No. 331,877, and practically any other conventional closure and/or opening devices. The containers of the present invention may also be adapted to be pierced and opened by straws or other similar means. Additionally, it is preferred that the containers of the present invention may be torn open using substantially the same methods as those disclosed in U.S. Pat. Nos. 6,062,470, 6,098,874, and 6,241,646. Moreover, some embodiments of the present invention may be opened and closed in substantially the same way as traditional gable top paperboard cartons.

The laminate structures of the present invention include a layer of foamed polymer. The layer of foamed polymer may be manufactured by conventional techniques such as extrusion, and it may be one element of a coextruded laminate. The layer of foamed polymer may be comprised of polyethylene terephthalate (PET), high density polyethylene, low density polyethylene, polypropylene, polystyrene or new or used compositions comprising any of these polymers. The layer of foamed polymer may also be comprised of any other suitable foamed polymer compositions that possess similar physical characteristics.

U.S. Pat. No. 5,391,582 provides an example of a foamed polymer composition that may be utilized in some embodiments of the present invention. However, U.S. Pat. No. 5,391,582 does not teach how to make laminate structures or containers using this material. In addition, U.S. Pat. No. 5,391,582 does not recognize the shortcomings of paperboard laminate structures, the benefits of foamed polymer laminate structures, or the advantages of replacing the paperboard layer of known laminate structures with a foamed polymer layer. In addition, some embodiments of U.S. Pat. No. 5,391,582 may use recycled materials. It should be recognized that Food and Drug Administration regulations prohibit the use of recycled materials as a product-contact surface. Therefore, recycled materials may not be used as a product-contact surface for food and beverage containers of the present invention.

Containers made from the laminate structures of the present invention may be formed and filled by known manufacturing systems and techniques. For example, the containers of the present invention may be manufactured by carton forming and filling machines that use either a web or "card" form of the laminate structure.

For example, a laminate structure of the present invention may be manufactured in a web form using a laminating extruder that is commercially available from Egan Davis Standard of Somerville, N.J. A container of the present invention may be manufactured from a web laminate structure using a packaging machine such as the one disclosed in U.S. Pat. No. 4,580,392 which was assigned at issue to Tetra Pak International AB of Sweden.

A laminate structure of the present invention may be manufactured into a sleeve form using a machine that is commercially available from International Paper Box Machine Company, Inc. of Nashua, N.H. A container of the present invention may be manufactured from these sleeves using a packaging and filling machine such as one which is commercially available from SIG Combibloc GmbH of Germany. Another example of a sleeve packaging machine is one such as manufactured by the Evergreen Packaging Company, Inc. of Cedar Rapids, Iowa.

Figure 2:
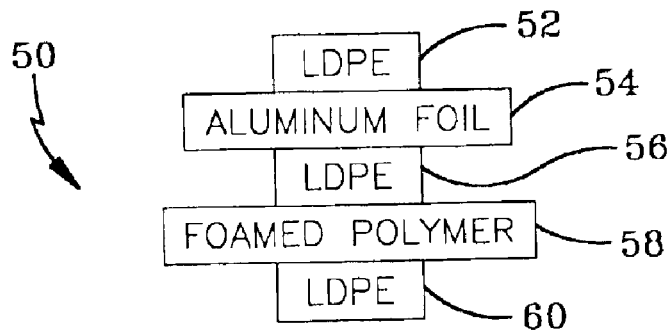
FIG. 2 is a cross sectional view of a second embodiment of a laminate structure of the present invention.
Figure 3:
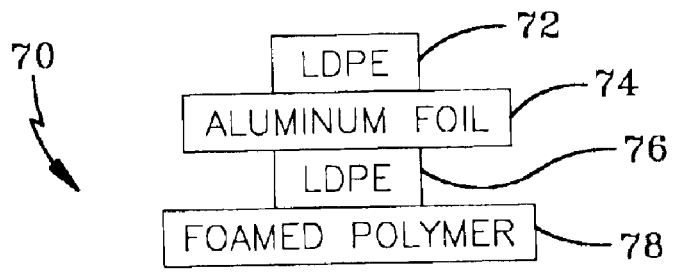
FIG. 3 is a cross sectional view of a third embodiment of a laminate structure of the present invention.

FIGS. 1 through 3 illustrate various embodiments of laminate structures of the present invention which include an aluminum foil barrier. In FIG. 1, the laminate structure 30 comprises a low density polyethylene (LDPE) layer 32, a layer of foamed polymer 34, a LDPE layer 36, a layer of aluminum foil 38, and a LDPE layer 42. Any commercial extrusion coating grade LDPE may be used for the LDPE layers of the present invention. The LDPE layer 32 may be extrusion coated on the outer surface of the layer of foamed polymer 34, and the LDPE layer 36 may be extrusion coated on the inner surface of the layer of foamed polymer 34. The layer of aluminum foil 38 may be applied on an inner surface of the LDPE layer 36. Finally, the product-contact surface may be the LDPE layer 42. The LDPE layer 42 may be adhesive laminated on the inner surface of the layer of aluminum foil 38.

Optionally, the laminate structure 30 may include a tie layer 40. The tie layer 40 may be useful to prevent delamination that may be caused by products that have a high acid content. The tie layer 40 may be coated on the inner surface of the layer of aluminum foil 38, and the LDPE layer 42 may be coated on the inner surface of the tie layer 40. Although any suitable adhesive material may be used to comprise the tie layers of the present invention, it is preferred that the tie layers are comprised of ethylene-based copolymers. An example of a suitable adhesive tie layer is Primacor. Dow Chemical manufactures Primacor. Other examples of suitable adhesive tie layers are ethylene acrylic acid (EAA), ethylene methyl acrylate (EMA), surlyn (acid copolymer), and polyethylene depending on the application.

The laminate structure 50 of FIG. 2 is comprised of a LDPE layer 52, a layer of aluminum foil 54, a LDPE layer 56, a layer of foamed polymer 58, and a LDPE layer 60. In this embodiment, the LDPE layer 52 is coated on the outer surface of the layer of aluminum foil 54, and the LDPE layer 56 is coated on the inner surface of the layer of aluminum foil 54. The layer of foamed polymer 58 coats the inner surface of the LDPE layer 56. Finally, the LDPE layer 60 coats the inner surface of the layer of foamed polymer 58.

FIG. 3 illustrates another embodiment of a laminate structure that includes a layer of aluminum foil. As shown in FIG. 3, the laminate structure 70 is comprised of a LDPE layer 72, a layer of aluminum foil 74, a LDPE layer 76, and a layer of foamed polymer 78 which are applied in the order listed. The layer of foamed polymer 78 is preferably the product-contact surface. In order to substantially prevent the absorption of the essential oils, flavors, and vitamins of juices, the layer of foamed polymer 78 is preferably comprised of polyethylene terephthalate.

Figure 4:
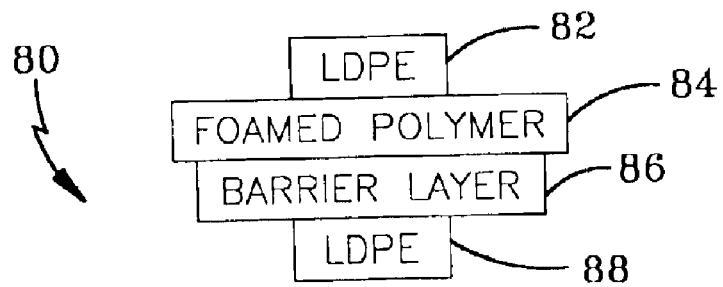
FIG. 4 is a cross sectional view of a fourth embodiment of a laminate structure of the present invention.
Figure 5:
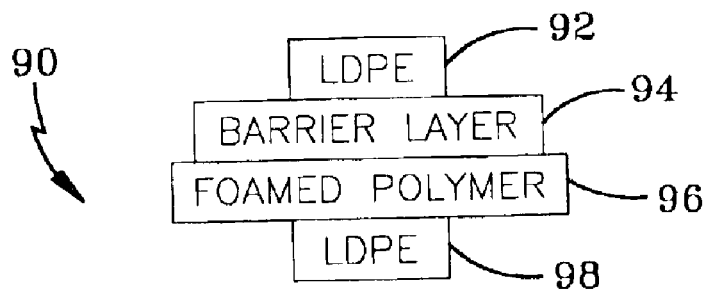
FIG. 5 is a cross sectional view of a fifth embodiment of a laminate structure of the present invention.
Figure 6:
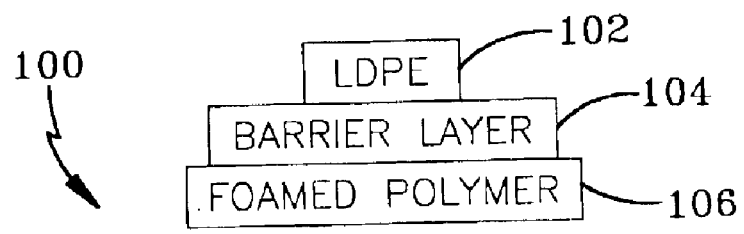
FIG. 6 is a cross sectional view of a sixth embodiment of a laminate structure of the present invention.

FIGS. 4 through 6 illustrate various embodiments of laminate structures of the present invention which are preferably microwaveable. In FIG. 4, the laminate structure 80 is comprised of a LDPE layer 82, a layer of foamed polymer 84, a barrier layer 86, and a LDPE layer 88 which secured together in the order listed. In FIG. 5, the laminate structure 90 is comprised of a LDPE layer 92, a barrier layer 94, a layer of foamed polymer 96, and a LDPE layer 98 which are coated in the order listed. The laminate structure 100 is comprised of a LDPE layer 102, a barrier layer 104, and a layer of foamed polymer 106 which are applied in the order listed.

The barrier layer of the present invention may be comprised of practically any suitable barrier material that is adapted to substantially prevent the transmission of oxygen or oxygen and water. For instance, the barrier layer of the present invention may be comprised of barrier material including, but not limited to, aluminum foil, polyethylene terephthalate, glycol-modified polyethylene terephthalate, acid-modified polyethylene terephthalate, EVOH, polymers of meta-xylylenediamine (MXD6), polyvinylidene chloride (PVDC), polyethylene naphthalate (PEN), liquid crystal polymers like polyester liquid crystals, compositions comprising any of these polymers, or other similar materials, polymers, or compositions. EVOH is available from the Eval Company of America. The use of a polymer as the barrier layer preferably allows the packaging or container to be suitable for microwave applications.

Figure 24:
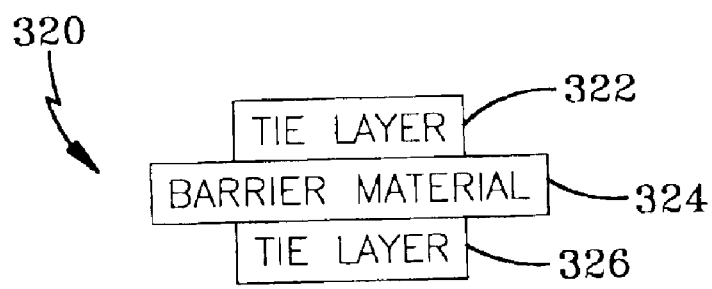
FIG. 24 is a cross sectional view of one embodiment of a barrier layer of the present invention.
Figure 25:
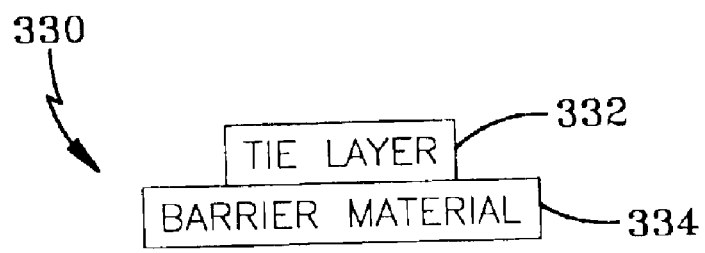
FIG. 25 is a cross sectional view of a second embodiment of a barrier layer of the present invention.

Those of ordinary skill in the art should recognize that the barrier layer of the present invention may be a multi-layer structure such as a multi-layer coextrusion. For example, either surface of the barrier material may be coated with polymer layers, tie layers, or combinations thereof. FIG. 24 illustrates an example of a barrier layer 320 that is a multi-layer structure. In this embodiment, the outer surface of the barrier material 324 is coated by an outer adhesive tie layer 322, and the inner surface of the barrier material 324 is coated by an inner adhesive tie layer 326. FIG. 25 illustrates another embodiment a barrier layer 330 that is a multi-layer structure. In this embodiment, the barrier layer 330 is comprised of a layer of barrier material 334 and an adhesive tie layer 332. The adhesive tie layer 332 coats the outer surface of the layer of barrier material 334.

Figure 7:
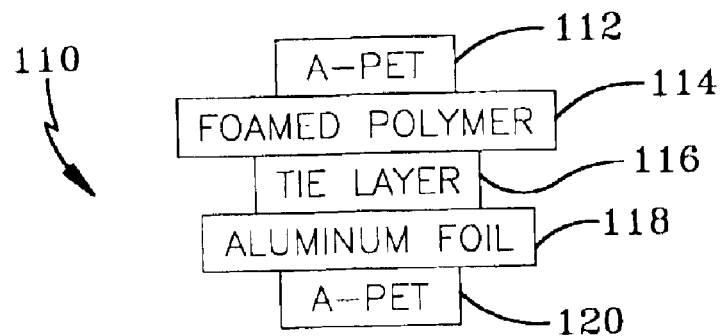
FIG. 7 is a cross sectional view of a seventh embodiment of a laminate structure of the present invention.
Figure 8:
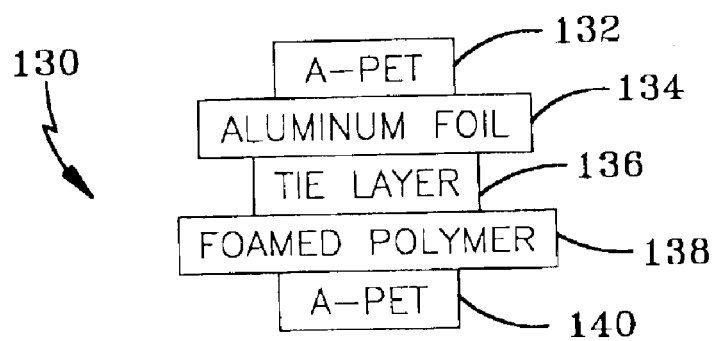
FIG. 8 is a cross sectional view of an eighth embodiment of a laminate structure of the present invention.
Figure 9:
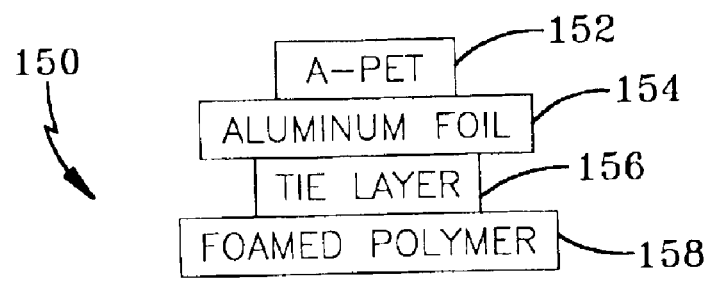
FIG. 9 is a cross sectional view of a ninth embodiment of a laminate structure of the present invention.

FIGS. 7 through 9 show various embodiments of laminate structures of the present invention which include a layer of aluminum foil and at least one layer of amorphous polyethylene terephthalate (A-PET). The laminate structure 110 of FIG. 7 is comprised of an A-PET layer 112, a layer of foamed polymer 114, a tie layer 116, a layer of aluminum foil 118, and an A-PET layer 120 which are applied in the order listed. In FIG. 8, the laminate structure 130 includes an A-PET layer 132, a layer of aluminum foil 134, a tie layer 136, a foamed polymer layer 138, and an A-PET layer 140 which are secured together in the order listed. Finally, FIG. 9 illustrates a laminate structure 150 which is comprised of an A-PET layer 152, a layer of aluminum foil 154, a tie layer 156, and a layer of foamed polymer 158 which are coated in the order listed.

A-PET may serve many purposes. For instance, information may be printed on a layer of A-PET using conventional printing techniques. In addition, A-PET may substantially prevent the scalping of the essential flavors, oils, and vitamins of juices when it is used as the product-contact surface as shown in FIGS. 7 and 8.

Figure 10:
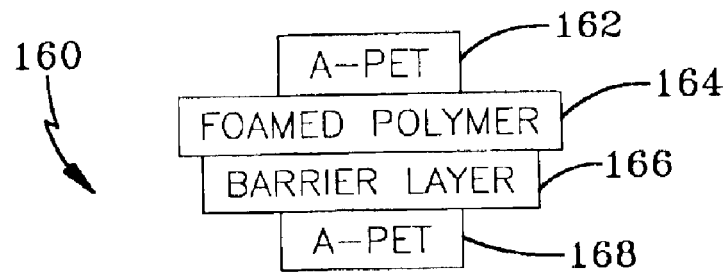
FIG. 10 is a cross sectional view of a tenth embodiment of a laminate structure of the present invention.
Figure 11:
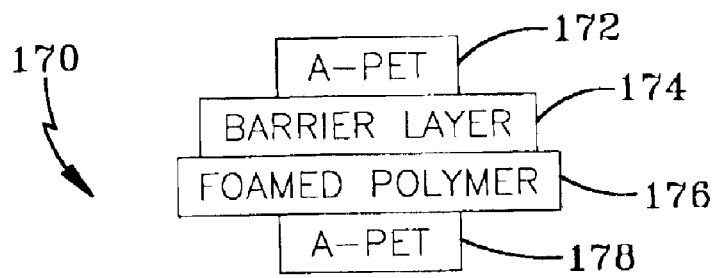
FIG. 11 is a cross sectional view of an eleventh embodiment of a laminate structure of the present invention.
Figure 12:
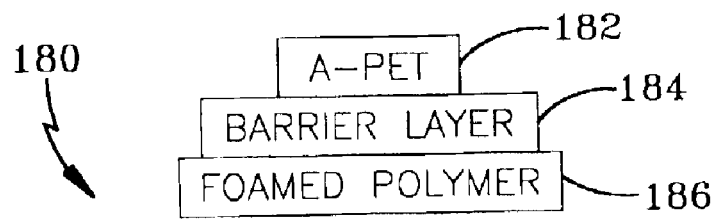
FIG. 12 is a cross sectional view of a twelfth embodiment of a laminate structure of the present invention.

FIGS. 10 through 12 show various embodiments of barrier laminate structures. In particular, FIG. 10 illustrates a laminate structure 160 which is comprised of an A-PET layer 162, a foamed polymer layer 164 such as a layer of foamed polyethylene terephthalate, a barrier layer 166, and an A-PET layer 168 which are coated in the order listed. The laminate structure 170 of FIG. 11 includes an A-PET layer 172, a barrier layer 174, a foamed polymer layer 176, and an A-PET layer 178 which are secured together in the order listed. Finally, FIG. 12 shows a laminate structure 180 which is comprised of an A-PET layer 182, a barrier layer 184, and a foamed polymer layer 186 which are stacked in the order listed.

Figure 13:
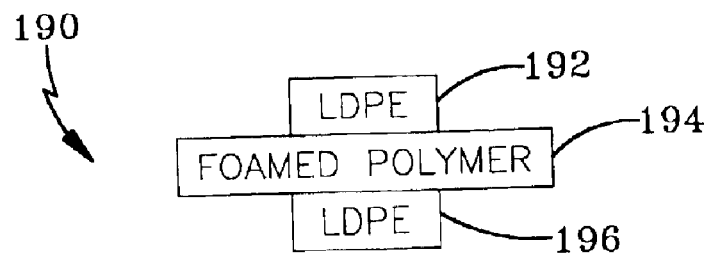
FIG. 13 is a cross sectional view of a thirteenth embodiment of a laminate structure of the present invention.
Figure 14:
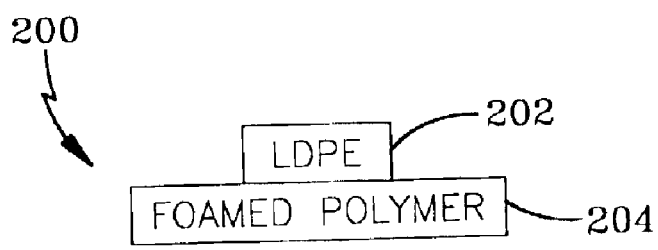
FIG. 14 is a cross sectional view of a fourteenth embodiment of a laminate structure of the present invention.
Figure 15:
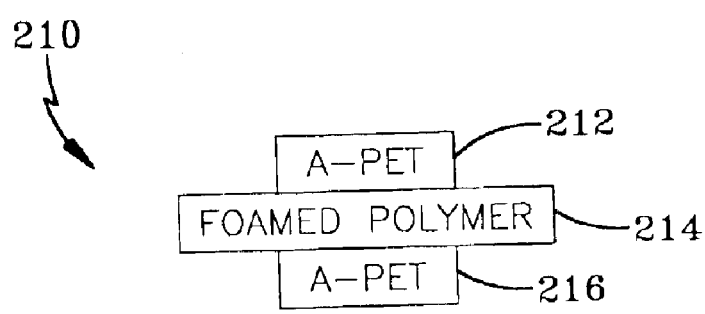
FIG. 15 is a cross sectional view of a fifteenth embodiment of a laminate structure of the present invention.
Figure 16:
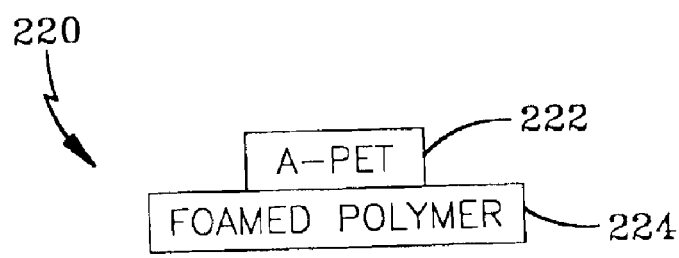
FIG. 16 is a cross sectional view of a sixteenth embodiment of a laminate structure of the present invention.
Figure 22:
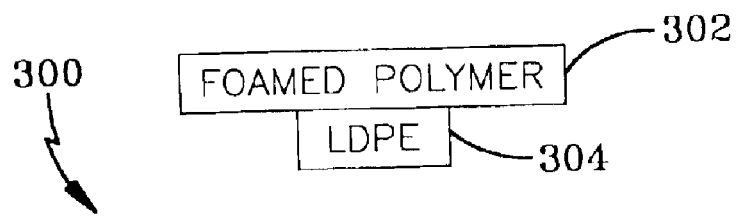
FIG. 22 is a cross sectional view of a twenty-second embodiment of a laminate structure of the present invention.
Figure 23:
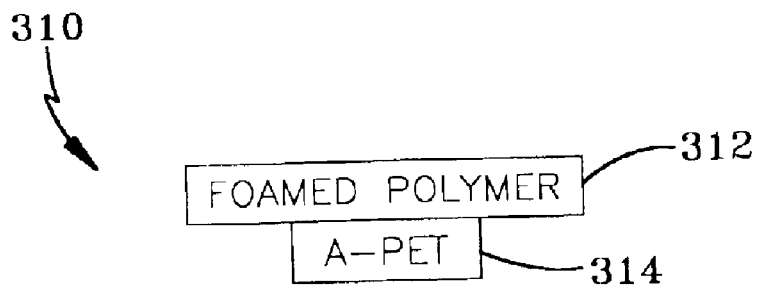
FIG. 23 is a cross sectional view of a twenty-third embodiment of a laminate structure of the present invention.

FIGS. 13 through 16, 22, and 23 show various embodiments of non-barrier laminate structures. The laminate structure 190 of FIG. 13 is comprised of a LDPE layer 192, a foamed polymer layer 194, and a LDPE layer 196 which are coated in the order listed. The laminate structure 200 of FIG. 14 includes a LDPE layer 202 that is secured to a foamed polymer layer 204. In FIG. 15, the laminate structure 210 comprises an A-PET layer 212, a foamed polymer layer 214, and an A-PET layer 216 which are applied in the order listed, and laminate structure 220 of FIG. 16 includes an A-PET layer 222 which is coated on a foamed polymer layer 224. FIG. 22 illustrates a laminate structure 300. The laminate structure 300 is comprised of a foamed polymer layer 302 that is applied on the outer surface of a LDPE layer 304. Finally, FIG. 23 shows a laminate structure 310 which comprises a foamed polymer layer 312 coated on the outer surface of an A-PET layer 314.

Figure 17:
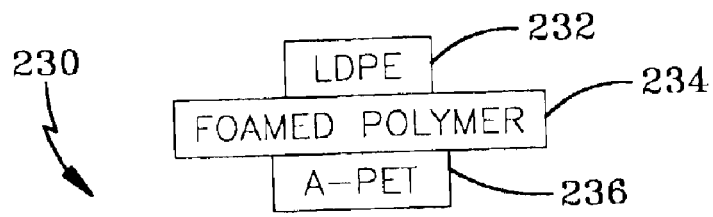
FIG. 17 is a cross sectional view of a seventeenth embodiment of a laminate structure of the present invention.
Figure 18:
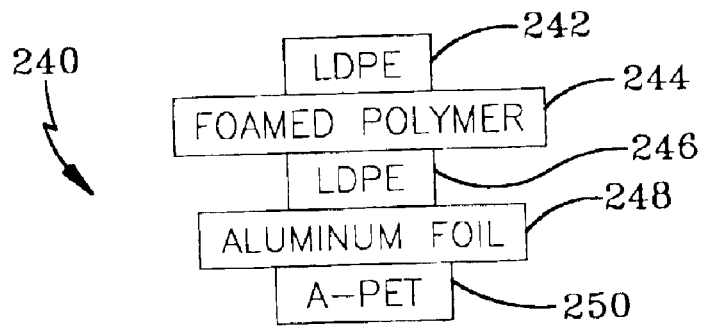
FIG. 18 is a cross sectional view of an eighteenth embodiment of a laminate structure of the present invention.
Figure 19:
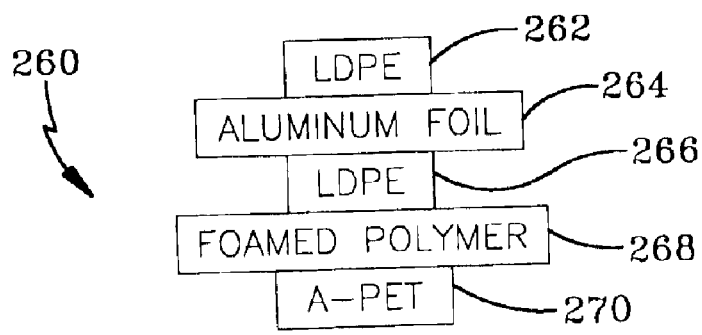
FIG. 19 is a cross sectional view of a nineteenth embodiment of a laminate structure of the present invention.
Figure 20:
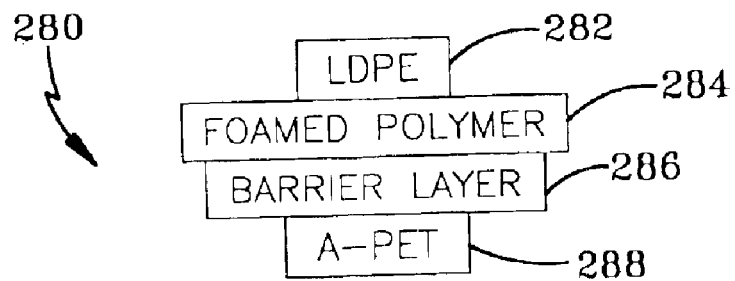
FIG. 20 is a cross sectional view of a twentieth embodiment of a laminate structure of the present invention.
Figure 21:
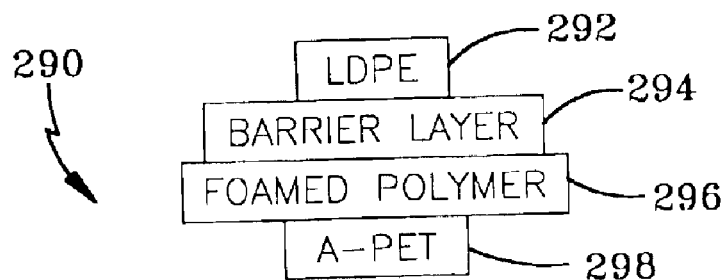
FIG. 21 is a cross sectional view of a twenty-first embodiment of a laminate structure of the present invention.

FIGS. 17 through 21 show various embodiments of laminate structures that have an outermost LDPE layer and an A-PET product-contact surface. In FIG. 17, the laminate structure 230 is comprised of an LDPE layer 232, a foamed polymer layer 234, and an A-PET layer 236 which are coated in the order listed. The laminate structure 240 of FIG. 18 includes a LDPE layer 242, a foamed polymer layer 244, a LDPE layer 246, a layer of aluminum foil 248, and an A-PET layer 250 which are applied in the order listed. In FIG. 19, the laminate structure 260 comprises a LDPE layer 262, a layer of aluminum foil 264, a LDPE layer 266, a foamed polymer layer 268, and an A-PET layer 270 which are secured together in the order listed. A laminate structure 280 is illustrated in FIG. 20. The laminate structure 280 includes a LDPE layer 282, a foamed polymer layer 284, a barrier layer 286, and an A-PET layer 288 which are applied in the order listed. Finally, the laminate structure 290 of FIG. 21 is comprised of a LDPE layer 292, a barrier layer 294, a foamed polymer layer 296, and an A-PET layer 298 which are coated in the order listed.

The laminate structures of the present invention may be heat sealed by conventional equipment ranging from about 250 degrees Fahrenheit to about 500 degrees Fahrenheit such that a non-polar homogeneous heat seal is created. For example, the laminate structures of the present invention may be heat sealed ultrasonically, by flame sealing, by hot air plus pressure (convection), and/or by induction. As is well known in the art, induction is a preferred method for heat sealing laminate structures of the present invention that include a layer of aluminum foil.

EXAMPLE

A card laminate structure was manufactured into a sleeve form using a sleeve forming machine that is commercially available from International Paper Box Machine Company, Inc. of Nashua, N.H. The laminate structure was comprised of an outer LDPE layer, a layer of foamed polyethylene terephthalate, a laminating LDPE layer, a layer of aluminum foil, a tie layer of Primacor, and an inner LDPE layer which were coated in the order listed. Table I shows the coat weights of the layers of the laminate structure.

TABLE 1

| Material | Coat Weights |
|---|---|
| 1. Outer LDPE layer | 18 g/m$^2$ |
| 2. Foamed PET | 120 g/m$^2$ |
| 3. Laminating LDPE layer | 20 g/m$^2$ |
| 4. Aluminum foil | 18 g/m$^2$ |

TABLE 1-continued

| Material | Coat Weights |
| --- | --- |
| 5. Primacor | 4 g/m$^2$ |
| 6. Inner LDPE layer | 51 g/m$^2$ |

The sleeve form of the laminate structure was formed into an aseptic container using a sleeve packaging and filling machine that is commercially available from SIG Combibloc GmbH of Germany. The sleeve packaging and filling machine effectively sterilized and heat sealed the aseptic container. The thicknesses and edges of the seals were vastly thinner when compared to those of comparable aseptic containers that are prepared from paperboard laminate structures. For this example, the aseptic container produced was of a lower weight than comparable aseptic containers that are prepared from paperboard laminate structures.

Although specific coat weights and specifications for the various layers have been provided in the example, those skilled in the art should recognize that the thicknesses, coat weights, and specifications of the layers may vary depending on the packaging application. For example, the thicknesses of the layers of the present invention may be comparable to the thicknesses of the layers of known paperboard laminate structures that may serve substantially the same uses and purposes.

Additionally, various conventional coating techniques may be utilized to apply the layers of the laminate structures of the present invention. For example, a foamed polymer layer may be flame treated and then a layer of molten LDPE, barrier material, or A-PET may be coated onto a surface of the foamed polymer layer by extrusion coating. In addition, a tie layer may be extrusion laminated onto the surface of the layer to which it is to be secured. Finally, aluminum foil may be adhesive laminated with a LDPE layer or an A-PET layer. However, it should be recognized that the present invention may be achieved by any suitable technique for applying the layers such as, but not limited to, extrusion, coextrusion, adhesive lamination, single layer films, and multi-layer films.

An intent of the inventors is to patent containers prepared from laminate structures that include a layer of foamed polymer. Obviously, it is not reasonable to expressly describe every possible embodiment of foamed polymer laminate structures. Accordingly, the preferred embodiments herein disclosed are not intended to be exhaustive or to unnecessarily limit the scope of the invention. The preferred embodiments were chosen and described in order to explain the principles of the present invention so that others skilled in the art may practice the invention. Having shown and described preferred embodiments of the present invention, those skilled in the art will realize that many variations and modifications may be made to affect the described invention. Many of those variations and modifications will provide the same result and fall within the spirit of the claimed invention. It is the intention, therefore, to limit the invention only as indicated by the scope of the claims.

What is claimed is:

1. An aseptic closed container for foods or beverages, said container comprising:
 a laminate structure excluding paperboard, said laminate structure comprising:
 a layer of foamed polymer having an inner surface and an outer surface, wherein said layer of foamed polymer is selected from the group consisting of styrenic polymers, olefinic polymers, and polyester polymers;
 a first layer of low density polyethylene having an outer surface and an inner surface, said inner surface of said first layer of low density polyethylene coated on said outer surface of said layer of foamed polymer; and
 a layer of amorphous polyethylene terephthalate having an outer surface and an inner surface, said outer surface of said layer of amorphous polyethylene terephthalate coated on said inner surface of said layer of foamed polymer; wherein said laminate structure is folded and heat sealed to form said container.

2. The container according to claim 1 wherein said laminate structure has been heat sealed by conventional equipment at temperatures ranging from about 250 degrees Fahrenheit to about 500 degrees Fahrenheit such that a non-polar homogeneous heat seal is created.

3. The container according to claim 2 wherein said conventional equipment is selected from the group consisting of: web packaging machines and sleeve filling machines.

4. An aseptic closed container for foods or beverages, said container comprising:
 a laminate structure excluding paperboard, said laminate structure comprising:
 a layer of foamed polymer having an inner surface and an outer surface, wherein said layer of foamed polymer is selected from the group consisting of styrenic polymers, olefinic polymers, and polyester polymers;
 a first layer of low density polyethylene having an outer surface and an inner surface, said inner surface of said first layer of low density polyethylene coated on said outer surface of said layer of foamed polymer;
 a second layer of low density polyethylene having an outer surface and an inner surface, said outer surface of said second layer of low density polyethylene coated on said inner surface of said layer of foamed polymer; and
 a layer of amorphous polyethylene terephthalate having an outer surface and an inner surface, said outer surface of said layer of amorphous polyethylene terephthalate coated on said inner surface of said second layer of low density polyethylene;
 wherein said laminate structure is folded and heat sealed to form said container.

5. The container according to claim 4 wherein said laminate structure has been heat sealed by conventional equipment at temperatures ranging from about 250 degrees Fahrenheit to about 500 degrees Fahrenheit such that a non-polar homogeneous heat seal is created.

6. The container according to claim 5 wherein said conventional equipment is selected from the group consisting of: web packaging machines and sleeve filling machines.

7. An aseptic closed container for foods or beverages, said container comprising:
 a laminate structure excluding paperboard, said laminate structure comprising:
 a layer of foamed polymer having an inner surface and an outer surface, wherein said layer of foamed polymer is selected from the group consisting of styrenic polymers, olefinic polymers, and polyester polymers;
 a first layer of low density polyethylene having an outer surface and an inner surface, said inner surface of said first layer of low density polyethylene coated on said outer surface of said layer of foamed polymer;
 a layer of amorphous polyethylene terephthalate having an outer surface and an inner surface, said outer surface of said layer of amorphous polyethylene terephthalate coated on said inner surface of said layer of foamed polymer; and a second layer of low density polyethylene having an outer surface and an inner surface, said outer surface of said second layer of low density polyethylene coated on said inner surface of said layer of amorphous polyethylene terephalate;

wherein said laminate structure is folded and heat sealed to form said container.

8. The container according to claim 7 wherein said laminate structure has been heat sealed by conventional equipment at temperatures ranging from about 250 degrees Fahrenheit to about 500 degrees Fahrenheit such that a non-polar homogeneous heat seal is created.

9. The container according to claim 8 wherein said conventional equipment is selected from the group consisting of: web packaging machines and sleeve filling machines.

* * * * *